Oct. 24, 1950  W. A. BEDFORD, JR  2,527,053
CLOSURE AND FASTENER MEMBER
Filed May 27, 1947

Inventor
WILLIAM A BEDFORD Jr.,
By John Todd
Attorney

Patented Oct. 24, 1950

2,527,053

UNITED STATES PATENT OFFICE 2,527,053

CLOSURE AND FASTENER MEMBER

William A. Bedford, Jr., North Scituate, Mass., assignor to United-Carr Fastener Corporation, Cambridge, Mass., a corporation of Massachusetts Application May 27, 1947, Serial No. 750,798

5 Claims. (Cl. 85—9)

The present invention relates to combined closure and fastener members, and aims generally to improve existing members of that type.

A primary object of the invention is the provision of an improved closure member of the plug button type having an aperture closing surface and peripherally arranged spring fingers adapted for snap fastener engagement with the aperture wall of a support, said aperture closing surface having combined therewith a male or stud fastener member adapted for connection with a part to be attached to the support.

A further object of the invention is the provision of simplified means for securing the male or stud fastener member to the closure surface of the plug button or closure member.

Other aims and objects of the invention will be apparent to persons skilled in the art by reference to the accompanying drawings and annexed specification illustrating and describing a preferred form of the invention.

Figure 1:
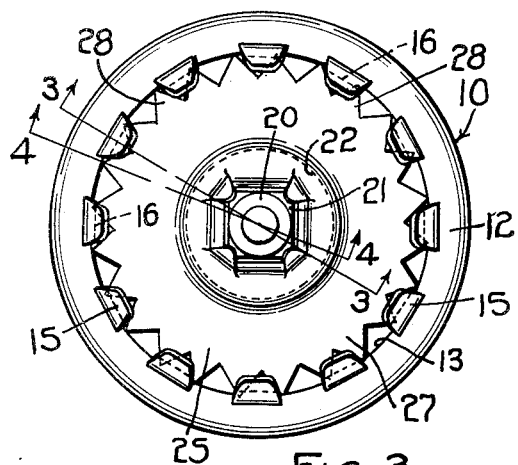
Fig. 1 is a plan view of a combined closure and fastener member according to a preferred embodiment of the invention, said view being taken from the inner support-engaging face of the closure member.
Figure 2:
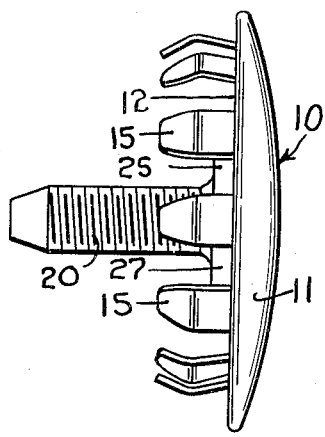
Fig. 2 is a side elevation of the combined closure and fastener member shown in Fig. 1.

Referring to the drawing, the present invention combines a closure member adapted for snap fastener attachment to an apertured support with a stud fastener member adapted for attachment to a second part which may be a support or a supported part.

In the embodiment selected for illustration the closure member may be, and preferably is in the form of a plug button 10 formed of suitable sheet material such as sheet metal, and adapted for snap fastener engagement with the aperture walls 2 of a support 1. The closure member or plug button preferably comprises an outwardly bowed or dished closure part 11, herein illustrated as circular in shape, and formed with an inturned peripheral edge 12 presenting an annular support-engaging surface. A plurality of resilient snap fastener fingers 15 are formed integrally with the inner peripheral rim 13 of the inturned edge 12 and are connected thereto by arcuate bight portions 16 which extend radially inwardly from the rim 13 of the inturned edge. The fingers 15 diverge outwardly from the bight portions 16 and have inwardly directed terminal ends for ready insertion into the aperture of the support. The spring fingers 15 are adapted to make snap fastener engagement with the aperture walls 2 of the support 1, and thus retain the closure member or plug button in place therein.

The present invention combines with such a closure member or plug button a male or stud fastener member of suitable design, herein illustrated as a screw, for attachment to a second apertured part 3 which may be in the nature of a support or a supported part depending upon the character of the installation in which the invention is used.

According to the illustrated embodiment, the screw fastener member has a usual threaded shank 20, a square shank base 21, and an enlarged head 22, the latter having bearing engagement with the inner face of the dished closure part 11. The shank 20 of the screw is disposed generally normal to the dished closure part 11.

The stud fastener member 20 is held in fixed assembled relation centrally of the closure member or button 10 by means of a retaining member 25 which conveniently may be in the form of a washer or like part of general cupped or conical form and having an apertured central part 26. The aperture of the central part is normally of a size to loosely or readily slip over the threaded shank 20 and squared shank base 21, the body of the member 25 being in the form of a skirt 27 extending angularly from the apertured central part 26 and terminating in a serrated outer peripheral edge 28. The normal diameter of the edge 28 is such that the serrated edge may be easily forced past the terminal ends of the fingers 15.

Figure 3:
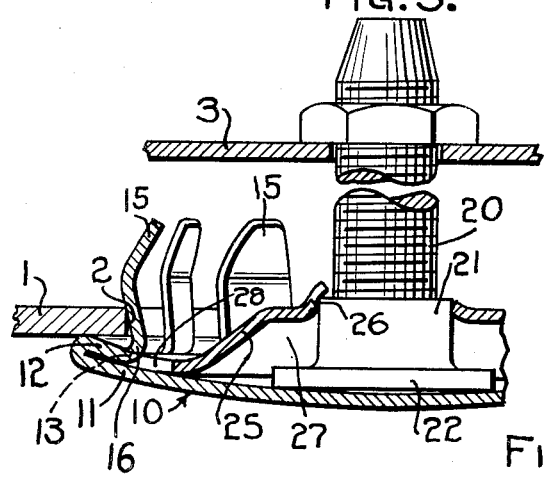
Fig. 3 is an enlarged fragmental vertical sectional view as taken on the line 3—3 of Fig. 1.
Figure 4:
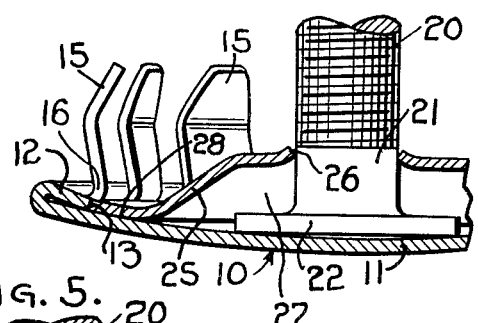
Fig. 4 is an enlarged fragmental sectional view as taken on the line 4—4 of Fig. 1.
Figure 5:
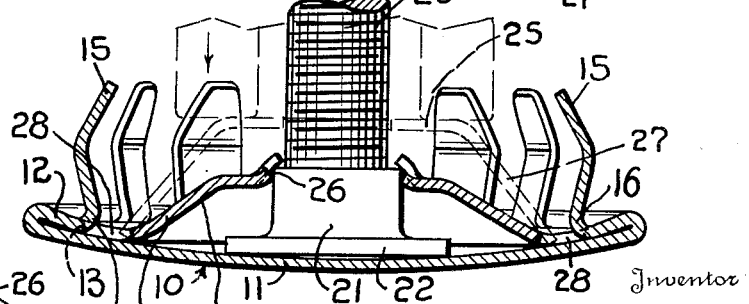
Fig. 5 is an enlarged vertical sectional view illustrating the manner of applying and affixing the fastener clamping member.
Figure 6:
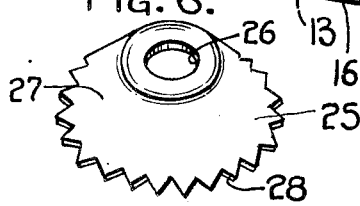
Fig. 6 is a detail perspective view of the fastener clamping member.

The washer 25 is formed of relatively stiff deformable material, for example sheet metal, and is adapted to be deformed by pressure to a substantially flat form as shown in Figs. 3, 4, and 5. In such flattened form the aperture of the central portion 26 is contracted to tightly grip the squared shank base 21 of the screw and the serrated peripheral edge 28 is forced outwardly under the finger bight portions 16 which extend radially inwardly of the rim 13 of the inturned edge 12 of the button or closure 10.

The retaining washer 25 is preferably assembled with the closure or plug button 10 with the skirt 27 disposed downwardly as shown in dotted lines in Fig. 5. In this position, the central aperture 26, which is normally of slightly greater diameter than the screw shank 20 and squared shank base 21, easily fits around the base, permitting the skirted edge 28 to bear on the inner face of the closure surface 11 of the plug button. It will be understood that the normal diameter of the serrated skirt edge 28 is slightly less than the inturned diameter of the support-engaging surface rim 13.

Upon application of pressure upon the central portion of the washer 25 by suitable means as is indicated in dotted lines Fig. 5, the central portion of the cupped or conical shaped washer is pressed toward the head 22 of the screw, tending to flatten the washer to the form shown in full lines in Fig. 5. As the washer is flattened, the diameter of the central aperture 26 is decreased so that the washer tightly grips the shank base 21 of the screw, and the diameter of the serrated edge 28 is increased, so that the teeth ends underlie the rim 13, or at least the overhanging bight portions 16 of the fingers 15. The deformed washer 25, being of relatively stiff resilient material, provides inwardly tensioned peripheral edges adapted for tensioned engagement with the inner edge of the rim 13 or the bight portions 16 of the fingers 15. Thus the screw 20 is held in secured coaxial assembly with the closure member 10.

While I have illustrated annd described one preferred embodiment of the invention, I do not intend to be limited thereby as the scope of the invention is best defined in the appended claims.

I claim:

1. A combined plug button and fastener screw comprising a button part having a closure surface and inturned peripheral edge presenting a support-engaging surface, resilient support-engaging fingers integrally connected to said inturned peripheral edge and adapted for snap fastener engagement with an aperture wall of a support, a headed screw having its head portion bearing against the inner face of said closure surface, and a retaining member of non-resilient material for retaining said screw substantially centrally of said button, said retaining member having a central aperture gripping said screw and its peripheral edge underlying said support-engaging fingers.

2. A combined plug button and fastener screw comprising a button part having a closure surface and inturned peripheral edge presenting a support-engaging surface, resilient support-engaging fingers integrally connected to said inturned peripheral edge and adapted for snap fastener engagement with an aperture wall of a support, a headed screw having its head portion bearing against the inner face of said closure surface, and a normally cup-shaped washer of non-resilient material having a normal diameter to be passed between said fingers and a central apertured portion loosely surrounding said screw, said washer being deformable to substantially flat form to cause the apertured portion to grip said screw and the outer peripheral edge to be snapped under said support-engaging fingers.

3. A combined plug button and fastener screw comprising a button part having a closure surface and inturned peripheral edge presenting a support-engaging surface, resilient support-engaging fingers integrally connected to said inturned peripheral edge and adapted for snap fastener engagement with an aperture wall of a support, a headed screw having its head portion bearing against the inner face of said closure surface, and a normally cup-shaped washer of non-resilient material having a serrated peripheral edge of normal diameter to be passed between said fingers and a central apertured portion loosely surrounding said screw, said washer being deformable to substantially flat form to cause the apertured portion to grip said screw and the serrated peripheral edge to be snapped under said support-engaging fingers.

4. A combined plug button and fastener screw comprising a button part having a closure surface and inturned peripheral edge presenting a support-engaging surface, resilient support-engaging fingers integrally connected to said inturned peripheral edge and adapted for snap fastener engagement with an aperture wall of a support, a headed screw having its head portion bearing against the inner face of said closure surface, and a normally cup-shaped washer of non-resilient material having a normal diameter to be passed within said fingers and support-engaging surfaces and a central apertured portion loosely surrounding said screw, said washer being deformable to substantially flat form to cause the apertured portion to grip said screw and the outer peripheral edge to be snapped under said support-engaging fingers.

5. A combined button and fastener member comprising a button part having a closure surface and inturned peripheral edge presenting a support-engaging surface, a fastener member having a head portion bearing against the inner face of said closure surface, and a normally cup-shaped washer of non-resilient material with a peripheral edge having a normal diameter to be passed within said inturned peripheral edge and central apertured portion loosely surrounding said fastener member, said washer being deformable to substantially flat form to cause the apertured portion to grip said fastener member and portions of said peripheral edge to be tensioned against the inner surface of said inturned peripheral edge.

WILLIAM A. BEDFORD, Jr.

REFERENCES CITED

The following references are of record in the file of this patent:

UNITED STATES PATENTS

| Number | Name | Date |
|---|---|---|
| 1,275,139 | Doran | Aug. 6, 1918 |
| 2,238,238 | Westrope | Apr. 15, 1941 |
| 2,401,856 | Brock | June 11, 1946 |